United States Patent
Furniturewala et al.

(10) Patent No.: US 6,427,199 B1
(45) Date of Patent: Jul. 30, 2002

(54) METHOD AND APPARATUS FOR EFFICIENTLY TRANSFERRING DATA BETWEEN PERIPHERALS IN A SELECTIVE CALL RADIO

(75) Inventors: Irfan Mohamedali Furniturewala; John Graham Frierson, both of Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/234,052

(22) Filed: Jan. 19, 1999

(51) Int. Cl.[7] ............................................. G06F 12/00
(52) U.S. Cl. ........................ 711/202; 711/209; 711/105
(58) Field of Search ............................... 711/202, 102, 711/104, 105, 1, 211, 209; 326/41, 39

(56) References Cited

U.S. PATENT DOCUMENTS

| | | | |
|---|---|---|---|
| 3,914,747 A | * 10/1975 | Barnes et al. ............... | 711/202 |
| 5,440,755 A | 8/1995 | Harwer et al. | |
| 5,469,003 A | * 11/1995 | Kean ........................... | 326/39 |
| 5,751,975 A | 5/1998 | Gillespie et al. | |

* cited by examiner

Primary Examiner—Matthew Kim
Assistant Examiner—Matthew D. Anderson
(74) Attorney, Agent, or Firm—Randi L. Dulaney

(57) ABSTRACT

A selective call radio (300) includes a memory (100), which in turn includes one or more memory elements; a row and column decoder (110, 112) coupled to the one or more memory elements, an address and data bus (102, 108). A first portion of the address bus is coupled to the row decoder, and a second portion of the address bus is coupled to the column decoder. The data bus is coupled to the column decoder. Each of the one or more memory elements has a memory map (FIG. 3) determined by: mapping each memory element to multiple addresses of the memory's memory space and, for each address mapped to a memory element, mapping the memory element to a corresponding bit range of the data bus.

16 Claims, 3 Drawing Sheets

TABLE 1

| ADDRESS MAP (HEX) | DATA BUS BIT RANGE | | | |
|---|---|---|---|---|
| | D[31:24] | D[23:16] | D[15:8] | D[7:0] |
| 0 | ----- | ----- | ----- | R0 |
| 4 | ----- | ----- | ----- | R1 |
| 8 | ----- | ----- | ----- | R2 |
| C | ----- | ----- | ----- | R3 |
| 10 | ----- | ----- | ----- | R4 |
| 14 | ----- | ----- | ----- | R5 |
| 18 | ----- | ----- | ----- | R6 |
| 1C | ----- | ----- | ----- | R7 |

*FIG. 1*   PRIOR ART

TABLE 2

| ADDRESS MAP (HEX) | DATA BUS BIT RANGE | | | |
|---|---|---|---|---|
| | D[31:24] | D[23:16] | D[15:8] | D[7:0] |
| 0 | R0 | R1 | R2 | R3 |
| 4 | R4 | R5 | R6 | R7 |

*FIG. 2*   PRIOR ART

TABLE 3

| ADDRESS MAP (HEX) | DATA BUS BIT RANGE | | | |
|---|---|---|---|---|
| | D[31:24] | D[23:16] | D[15:8] | D[7:0] |
| 0 | ----- | ----- | ----- | R0 |
| 4 | ----- | ----- | ----- | R1 |
| 8 | ----- | ----- | ----- | R2 |
| C | ----- | ----- | ----- | R3 |
| 10 | ----- | ----- | R0 | R1 |
| 14 | ----- | ----- | R2 | R3 |
| 18 | R0 | R1 | R2 | R3 |
| 1C | ----- | ----- | ----- | R4 |
| 20 | ----- | ----- | ----- | R5 |
| 24 | ----- | ----- | ----- | R6 |
| 28 | ----- | ----- | ----- | R7 |
| 2C | ----- | ----- | R4 | R5 |
| 30 | ----- | ----- | R6 | R7 |
| 34 | R4 | R5 | R6 | R7 |

*FIG. 3*

METHOD AND APPARATUS FOR EFFICIENTLY TRANSFERRING DATA BETWEEN PERIPHERALS IN A SELECTIVE CALL RADIO

FIELD OF THE INVENTION

This invention relates in general to selective call radios, and particularly, to a method and apparatus for efficiently transferring data between peripherals in a selective call radio.

BACKGROUND OF THE INVENTION

As demand for portable battery-operated units continues to grow, manufacturers of these portable units are striving to improve power efficiency to extend their battery life. Improvements in submicron semiconductors fabrication has significantly contributed to an extended battery life for portable units. However, there are circumstances where power efficiency remains below expectations.

This problem generally arises when peripherals of differing memory architectures are coupled together through a standard bus. For example, to update registers of an 8-bit peripheral coupled to a standard conventional 32 bit bus, such as the AMBA (Advanced Micro-controller Bus Architecture), a sourcing peripheral (e.g., a microprocessor) is forced to use the lower 8 bits of the data bus to execute read and write cycles to these registers. Table 1 of FIG. 1 illustrates how registers of an 8-bit peripheral (e.g., a memory) are mapped both in memory space and on the data bus of an AMBA standard bus.

The first column of Table 1 provides the address mapping of registers "R0" through "R7". The subsequent four columns of Table 1 show the bit range assignment of these registers on the AMBA data bus. As should be evident from Table 1, register "R0" is memory mapped so that it occupies addresses 0 through 3 in hex. For performing read and write cycles, only the lower 8 bits of the 32 bit data bus (i.e., D[7:0]) are utilized. The upper 24 bits of the 32 bit data bus (i.e., D[31:8]) are kept either floating or fixed to a particular logic value (e.g., "0") during a read or write cycle. Hence, in the instance where registers "R0" through "R7" need to be updated, eight 32 bit write cycles are necessary to complete the update of these registers. Clearly, each of these write cycles fails to take advantage of the upper three unused bytes (i.e., D[31:24], D[23:16]) and D[15:8]) of the 32 bit data bus, which if utilized could reduce the foregoing update to two write cycles, thereby substantially reducing power consumption.

To avoid the foregoing problem, prior art systems have concatenated 8 bit registers to utilize all byte positions of a 32 bit data bus. This method is illustrated in Table 2 as depicted in FIG. 2. According to this method, registers "R0" through "R3" occupy the memory space 0 through 3 in hex. Each register occupies a corresponding byte segment of the data bus, thereby utilizing the entire bit range of the data bus. Hence, to update registers "R0" through "R3", a 32 bit microprocessor will source a 32 bit write cycle, whereby "R0" occupies the most significant byte of the data bus (i.e., D[31:24]), "R1" occupies the next contiguous byte segment of the data bus (i.e., D[23:16]) and so on as shown in FIG. 2. Consequently, only two write cycles (one at addresses "0", and the other at address "4" in hex) are necessary for updating eight registers. This improves power efficiency by a factor of approximately 400% when compared to the previous example. Although on its face the improvement is substantial, this method in the art continues to suffer from inefficiencies in certain circumstances.

Principally, problems arise when in the example above only a few registers need to be updated. For example, assume that only registers "R0" and "R4" require an update. In this instance, the sourcing device must recall the values of "R1" through "R3", and "R5" through "R7", respectively, to avoid overwriting the values included in these registers. Because of the additional software instructions cycles necessary for retrieving information on the unchanged registers, the power savings originally mentioned are substantially diminished in circumstances where only a few concatenated registers need to be updated.

The impact that the aforementioned deficiencies in the prior art have on the battery life performance of portable battery operated units becomes evident when power efficiency is calculated over millions of data transactions occurring between peripherals included in a selective call radio. Accordingly, what is needed is a method and apparatus for efficiently transferring data between peripherals in a selective call radio.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

FIGS. 1 and 2 illustrate alternative methods used in prior art systems for mapping registers of 8 bit peripherals coupled to a standard 32 bit data bus;

FIG. 3 illustrates a method for efficiently mapping receiving peripheral to a standard 32 bit data bus according to the present invention;

DESCRIPTION OF THE PREFERRED EMBODIMENTS

FIG. 3 illustrates a method for efficiently mapping a receiving peripheral to a standard 32 bit data bus according to the present invention. It will be appreciated that although FIG. 3 illustrates a preferred embodiment of the present invention, it will be obvious to those skilled in the art that many alterations and variations may be made without departing from the invention. Accordingly, it is intended that all such alterations and variations be considered as within the spirit and scope of the invention as defined by the appended claims.

FIG. 3 illustrates a method according to the present invention for mapping memory elements of the receiving peripheral to an address bus and data bus in a manner that overcomes the disadvantages described above in the prior art. Table 3 of FIG. 3 shows eight memory elements depicted as registers ("R0" through "R7"), each register having a bit width of 8 bits. It will be appreciated that the term "register" is used generically to mean a memory element for storing data. The design of the register may take on any one of several embodiments, which will be described later.

As illustrated, each register is mapped to multiple addresses of the receiving peripheral's memory space. For example, "R0" is mapped to addresses 0, 10, and 18 (hex). Additionally, for each address mapped to a register, the register is mapped to a corresponding bit range of the 32 bit data bus. For example, "R0" is mapped at address "0" to the bit range D[7:0] of the data bus. Additionally, "R0" is mapped at address "10" to the bit range D[15:8], and at address "18" to the bit range D[31:24]. By mapping R0 to multiple addresses and corresponding bit ranges, data can be transferred between a sourcing peripheral and a receiving peripheral in an efficient manner.

Figure 6:
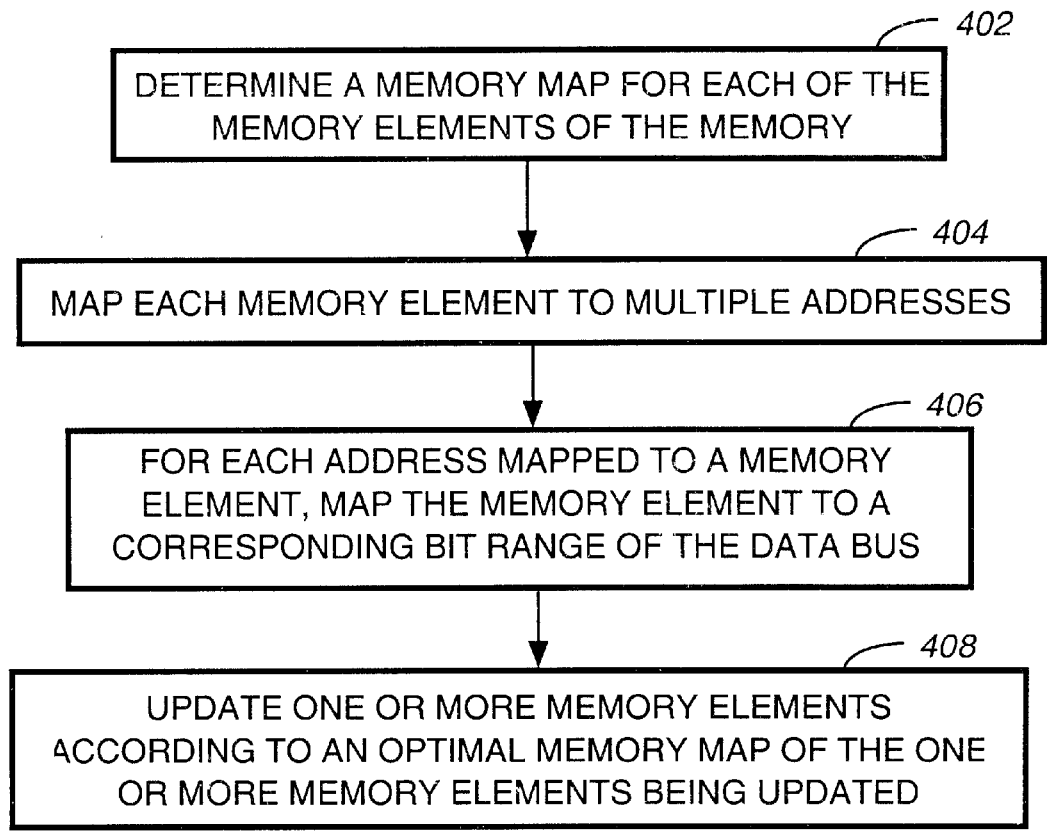
FIG. 6 shows a flow chart summarizing the operation of transferring data between peripherals according to the present invention.

FIG. 6 shows a flow chart 400 summarizing the operation of transferring data between peripherals according to the present invention. Steps 402, 404 and 406 have already been discussed based on the foregoing illustration of the register mapping depicted in FIG. 3. Step 408 describes the method for updating one or more registers of a receiving peripheral's memory based on the mapping of Table 3. Particularly, one or more registers of the receiving peripheral are updated by way of one or more write cycles of the address bus and data bus coupled to the receiving peripheral. Each write cycle is sourced by the sourcing peripheral, which is coupled to the same address and data bus. The mapping used in each write cycle to update the one or more registers is optimally selected by the sourcing peripheral to minimize the number of write cycles according to the memory map of the one or more registers being updated. To illustrate the operation of this step, several examples follow.

Assume as a first example that a single register, particularly, "R0" needs to be updated. For this situation, the sourcing peripheral selects address "0" and the bit range D[7:0] of the data bus. Hence, "R0" can be updated in a single instruction cycle and write cycle. If this same update were to take place according to the prior art mapping of Table 2 as shown in FIG. 2, then the sourcing peripheral would need to recall the values of "R1" through "R3" prior to updating "R0". This, as was already mentioned in the background of the invention, would require several software instruction cycles, which is less efficient when compared to the single instruction and write cycle just described for the present invention.

Assume as a second example that "R0" and "R1" need to be updated. For this case, the sourcing peripheral selects address "10" (hex) to update each of these registers in a single write cycle by mapping "R0" and "R1" to the bit ranges D[15:8] and D[7:0], respectively. This update would be substantially less efficient if implemented according to the prior art mapping of FIGS. 1 or 2. For Table 1, the same update would require two write cycles and multiple software instruction cycles. Similarly, for Table 2, the values of "R2" and "R3" would have to be retrieved prior to updating "R0" and "R1", thereby requiring additional software instruction cycles.

Finally, assume that registers "R0" through "R4" need to be updated. To minimize the number of write cycles, the sourcing peripheral would select address "18" to update registers "R0" through "R3", and address "1C" to update register "R4", thereby completing the update process in two write cycles. In comparison, updating "R0" through "R4" according to Table 1 requires five write cycles—three more cycles than what is required with the example for the present invention. Updating "R0" through "R4" according to Table 2 requires two write cycles, but substantially more software instruction cycles for updating "R4" as a result of having to retrieve the values for "R5" through "R7". The reader can appreciate the power savings provided by the present invention when the aforementioned examples are examined over millions of data transactions between peripherals.

Figure 4:
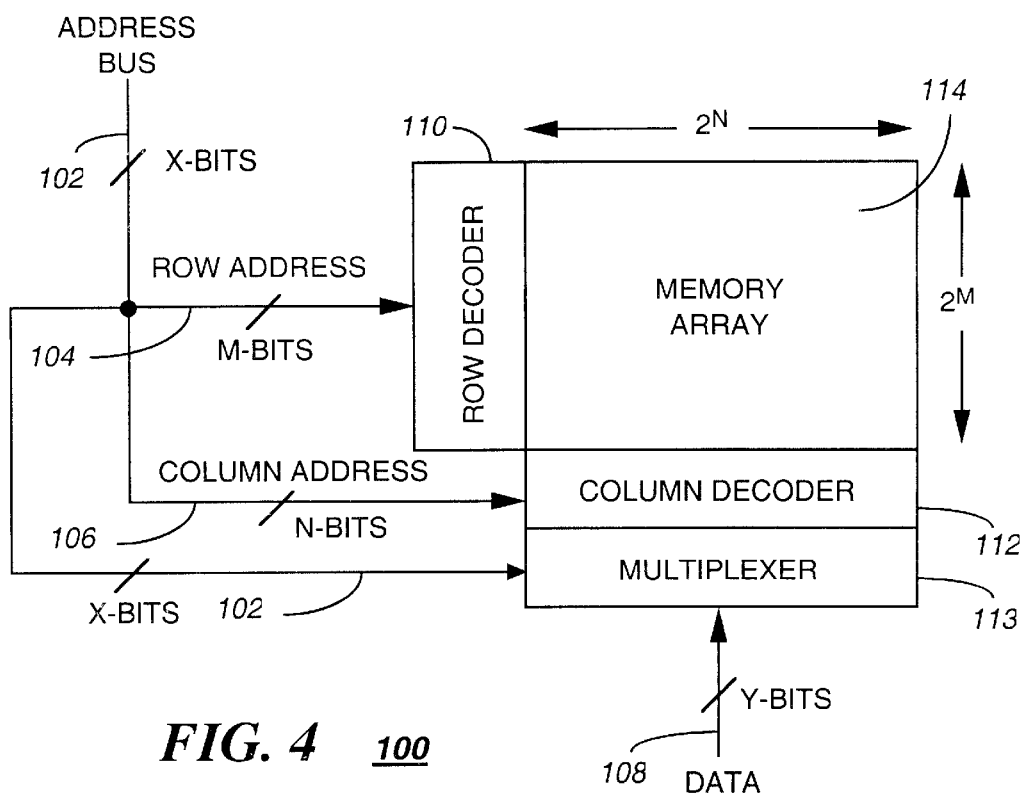
FIG. 4 shows an electrical block diagram of a memory architecture according to the present invention.

FIG. 4 shows an electrical block diagram of a memory architecture according to the present invention. The memory 100 comprises a memory array 114 including one or more memory elements (not shown) having a bit width of Z-bits. The memory array consists of either an array of conventional ROM (Read Only Memory) cells, and/or RAM (Random Access Memory) cells—neither of these cells is shown in FIG. 4; however, the structure of these cells is well known to those of ordinary skill in the art. Additionally, it will be appreciated that in the case of RAM cells, each of the cells can be either conventional static or dynamic RAM cells.

Each memory element is updated (RAM array only) or read (either RAM or ROM array) by a sourcing peripheral according to an address carried by the address bus 102 having a bit width of X-bits (X is preferably greater than or equal to 2 bits). Internal to the architecture of the memory 100, the address bus 102 is broken down into a row address bus 104 of M bits (capable of selecting any one of $2^M$ words, each word having a bit width of $2^N$ bits), and a column address bus 106 of N bits. The combination of these address buses provides for the selection of a corresponding one or more memory elements for reading and/or writing data thereto over a data bus 108 of Y-bits. The number of memory elements selected depends on the width of the data bus 108. The foregoing selection process is performed by the combined decoding and multiplexing functions of the row decoder 110, the column decoder 112 and the multiplexer 113.

To best understand the function of the row decoder 110, the column decoder 112 and the multiplexer 113, the example provided in Table 1 will be used as a means of describing these blocks. It will be appreciated, however, that the design of these blocks and the memory array may vary according to other memory mapped configurations consistent with the present invention. For example, memory elements may be less than a byte in width (e.g., 4 bits), and a memory element may be mapped to more addresses than shown in Table 3.

Turning to the example of Table 3, register "R0" is mapped to addresses 0, 10 and 18—as mentioned earlier. To accomplish this memory map assignment, the row decoder 110 and column decoder 112 must include conventional decoding logic for enabling a corresponding row of the memory array and column bits corresponding to the memory element representative of "R0" for any one of addresses 0, 10 and 18.

It should be noted that mapping "R0" to three addresses of the memory 100 does not represent three separate and independent memory elements representative of "R0". Rather, mapping "R0" to three addresses is representative of one memory element of the memory array 114 of FIG. 4. To accommodate the three bit ranges that register "R0" is mapped to (i.e., D[7:0] at address 0, D[15:8] at address 10, and D[31:24] at address 18), the multiplexer 113 must include decoding logic for decoding an address carried by the address bus 102 to route data on the data bus 108 to corresponding column bits of the memory array 114 representative of register "R0".

The row decoder 110, column decoder 112 and multiplexer 113 are likely to include more decoding logic than is generally necessary for a memory that is mapped in a conventional manner as shown in FIGS. 1 and 2. This additional decoding logic is a result of the multiple mapping of a memory element to several addresses and bit ranges of the address and data buses, respectively. Additionally, it should be noted that as a result of mapping multiple address to each memory element, the memory space is arguably less efficient than that shown in FIG. 2 for a concatenated register architecture.

These noted differences with the prior art are, however, negligible. In regards to a reduced memory space as a result of multiple address mapping of a register, the issue is moot when examined for large bus architectures. For example, a 32 bit address bus provides for a memory space of more than four billion addressable byte locations. Generally, prior art systems only utilize a fraction of this space for addressing memory. Consequently, mapping a register to multiple addresses has a negligible effect on memory capacity. The additional decoding logic necessary for the present invention is also inconsequential for several reasons. First, the additional decoding logic does not significantly increase the gate count of a memory. Second, as a result of improved submicron fabrication technology, the impact that the increased gate count has on die space is negligible. More importantly, the benefits in improved power efficiency for peripherals communicating according to the memory mapping scheme of the present invention outweighs the additional gate count.

Figure 5:
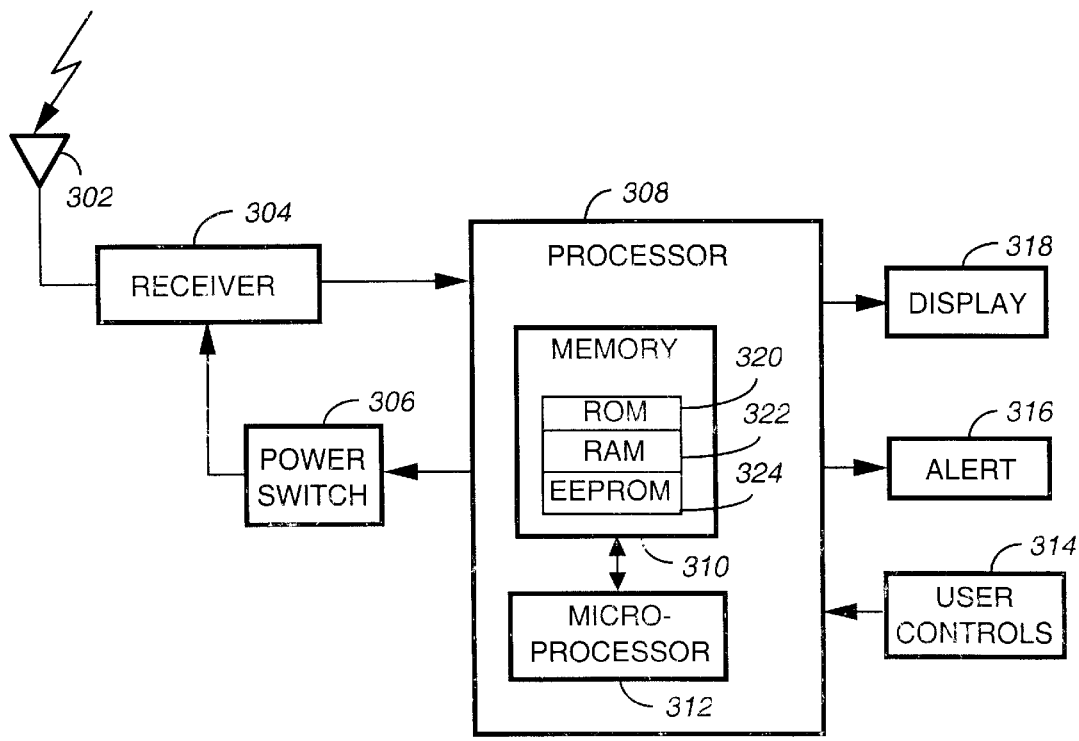
FIG. 5 shows an electrical block diagram of a SCR (selective call radio) utilizing the memory architecture of FIG. 4 according to the present invention.

As noted earlier in the background of the invention, interest in improving battery life performance in portable units is high. Accordingly, the present invention is especially important to the design and operation of battery-operated SCRs (selective call radios). FIG. 5 shows an electrical block diagram of a SCR 300 utilizing the memory architecture of FIG. 4 according to the present invention.

The SCR 300 comprises an antenna 302 for intercepting RF signals from, for example, a radio communication system (not shown). The antenna 302 is coupled to a receiver 304 employing conventional demodulation techniques for receiving the communication signals transmitted by the radio communication system. Radio signals received by the receiver 304 produce demodulated information, which is coupled to a processor 308 for processing received messages. A conventional power switch 306, coupled to the processor 308, is used to control the supply of power to the receiver 304, thereby providing a battery saving function.

To perform the necessary functions of the SCR 300, the processor 308 includes a microprocessor 312, and a memory 310 that includes nonvolatile and volatile memory portions, such as a ROM 320, RAM 322 and EEPROM (Electrically Erasable Programmable Read Only Memory) 324. These memories are preferably memory mapped in accordance with the present invention illustrated in the memory architecture of FIG. 4 to efficient transfer of data with the microprocessor 312.

Preferably, the microprocessor 312 is programmed by way of the ROM 320 to process incoming messages transmitted by the radio communication system. The microprocessor 312 decodes an address in the demodulated data of the received message, compares the decoded address with one or more addresses stored in the EEPROM 324, and when a match is detected, proceeds to process the remaining portion of the message. Once the microprocessor 312 has processed the message, it stores the message in the RAM 322, and a call alerting signal is generated to alert a user that a message has been received. The call alerting signal is directed to a conventional audible or tactile alerting device 316 for generating an audible or tactile call alerting signal. It will be appreciated that a portion of the memory 310 may be integrated into the microprocessor 312 for PCB (Printed Circuit Board) compactness.

The message can be accessed by the user through user controls 314, which provide functions such as lock, unlock, delete, read, etc. More specifically, by the use of appropriate functions provided by the user controls 314, the message is recovered from the RAM 322, and conveyed to the user by way of a display 318, e.g., a conventional liquid crystal display (LCD). It will be appreciated that, alternatively, the display 318 can be accompanied by an audio circuit (not shown) for conveying voice messages.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. A method for transferring data between a sourcing peripheral and a receiving peripheral, each peripheral coupled to an address bus having a bus width of two or more bits and a data bus having a bus width of Y-bits, wherein the receiving peripheral has a memory comprising one or more memory elements, each memory element having a bit width of Z-bits, whereby Z is less than or equal to Y, the method comprising the steps of:

for the receiving peripheral, determining a memory map for each of the one or more memory elements, wherein the determining step comprises the steps of:
mapping each memory element to multiple addresses including a first address and a second address of the receiving peripheral's memory space, wherein the mapping of each memory element includes:
mapping the memory element to the first address, wherein in the first address the memory element is combined with one or more memory elements, and
mapping the memory element to the second address, wherein in the second address the memory element is stored alone; and
for each address mapped to a memory element, mapping the memory element to a corresponding bit range of the data bus; and
updating one or more memory elements of the receiving peripheral by way of one or more write cycles of the address bus and the data bus, each write cycle sourced by the sourcing peripheral, wherein the mapping used in each write cycle to update the one or more memory elements is selected by the sourcing peripheral according to the memory map of the one or more memory elements being updated.

2. The method as recited in claim 1, wherein the mapping used in each write cycle to update the one or more memory elements includes accessing the memory element through one of the multiple addresses, and further wherein the address accessed is selected to minimize the number of write cycles.

3. The method as recited in claim 1, wherein the receiving peripheral further comprises a multiplexer coupled to the data bus and coupled to the address bus for multiplexing data carried by the data bus to a corresponding memory element according to the address carried by the address bus.

4. The method as recited in claim 1, wherein each memory element of the memory comprises one or more RAM (Random Access Memory) cells.

5. The method as recited in claim 4, wherein each RAM cell comprises a static RAM cell.

6. The method as recited in claim 4, wherein each RAM cell comprises a dynamic RAM cell.

7. A selective call radio, comprising:

a sourcing peripheral; and a receiving peripheral, wherein the sourcing peripheral and the receiving peripheral are each coupled to an address bus having a bus width of two or more bits and a data bus having a bus width of Y-bits, wherein the receiving peripheral has a memory comprising one or more memory elements, each memory element having a bit width of Z-bits, whereby Z is less than or equal to Y, wherein the sourcing peripheral transfers data to the receiving peripheral using a method comprising the steps of:

for the receiving peripheral, determining a memory map for each of the one or more memory elements, wherein the determining step comprises the steps of:

mapping each memory element to multiple addresses including a first address and a second address of the receiving peripheral's memory space, wherein the mapping of each memory element includes:

mapping the memory element to the first address, wherein in the first address the memory element is combined with one or more memory elements, and mapping the memory element to the second address, wherein in the second address the memory element is stored alone; and for each address mapped to a memory element, mapping the memory element to a corresponding bit range of the data bus; and updating one or more memory elements of the receiving peripheral by way of one or more write cycles of the address bus and the data bus, each write cycle sourced by the sourcing peripheral, wherein the mapping used in each write cycle to update the one or more memory elements is selected by the sourcing peripheral according to the memory map of the one or more memory elements being updated.

8. A memory, comprising:

one or more memory elements;

a row decoder coupled to the one or more memory elements;

a column decoder coupled to the one or more memory elements;

an address bus, wherein a first portion of the address bus is coupled to the row decoder, and a second portion of the address bus is coupled to the column decoder; and a data bus coupled to the column decoder, wherein each of the one or more memory elements has a memory map, and wherein the memory map for each of the one or more memory elements is determined by:

mapping each memory element to multiple addresses including a first address and a second address of the memory's memory space, wherein the mapping of each memory element includes:

mapping the memory element to the first address, wherein in the first address the memory element is combined with one or more memory elements, and mapping the memory element to the second address, wherein in the second address the memory element is stored alone, and for each address mapped to a memory element, mapping the memory element to a corresponding bit range of the data bus.

9. The memory as recited in claim 8, wherein one or more memory elements are updated by way of one or more write cycles of the address bus and the data bus, each write cycle sourced by a sourcing peripheral, and wherein the mapping used in each write cycle to update the one or more memory elements is selected by the sourcing peripheral according to the memory map of the one or more memory elements being updated.

10. The memory as recited in claim 9, wherein the mapping used in each write cycle to update the one or more memory elements includes accessing the memory element through one of the multiple addresses, and further wherein the address accessed is selected to minimize the number of write cycles.

11. The memory as recited in claim 8, wherein the memory further comprises a multiplexer coupled to the data bus and coupled to the address bus for multiplexing data carried by the data bus to a corresponding memory element according to the address carried by the address bus.

12. The memory as recited in claim 8, wherein each memory element of the memory comprises one or more RAM (Random Access Memory) cells.

13. The memory as recited in claim 12, wherein each RAM cell comprises a static RAM cell.

14. The memory as recited in claim 12, wherein each RAM cell comprises a dynamic RAM cell.

15. The memory as recited in claim 8, wherein each memory element of the memory comprises one or more ROM (Read Only Memory) cells.

16. A selective call radio comprising a memory, wherein the memory comprises:

one or more memory elements;

a row decoder coupled to the one or more memory elements;

a column decoder coupled to the one or more memory elements;

an address bus, wherein a first portion of the address bus is coupled to the row decoder, and a second portion of the address bus is coupled to the column decoder; and a data bus coupled to the column decoder, wherein each of the one or more memory elements has a memory map, and wherein the memory map for each of the one or more memory elements is determined by:

mapping each memory element to multiple addresses including a first address and a second address of the memory's memory space, wherein the mapping of each memory element includes:

mapping the memory element to the first address, wherein in the first address the memory element is combined with one or more memory elements, and mapping the memory element to the second address, wherein in the second address the memory element is stored alone; and for each address mapped to a memory element, mapping the memory element to a corresponding bit range of the data bus.

\* \* \* \* \*